US012090010B2

(12) United States Patent
Sun et al.

(10) Patent No.: US 12,090,010 B2
(45) Date of Patent: Sep. 17, 2024

(54) SMART ORAL CLEANER

(71) Applicant: NANJING PROFETA INTELLIGENT TECHNOLOGY CO., LTD., Suzhou (CN)

(72) Inventors: Yuchun Sun, Beijing (CN); Yaopeng Zhang, Beijing (CN); Yongsheng Zhou, Beijing (CN); Chuanbin Guo, Beijing (CN); Yong Wang, Beijing (CN); Yunsong Liu, Beijing (CN); Lei Zhang, Beijing (CN); Li Gao, Beijing (CN); Suli Guo, Beijing (CN); Wenru Zhai, Beijing (CN)

(73) Assignee: NANJING PROFETA INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/556,097

(22) PCT Filed: Apr. 14, 2022

(86) PCT No.: PCT/CN2022/086793
§ 371 (c)(1),
(2) Date: Oct. 19, 2023

(87) PCT Pub. No.: WO2022/222838
PCT Pub. Date: Oct. 27, 2022

(65) Prior Publication Data
US 2024/0216113 A1    Jul. 4, 2024

(30) Foreign Application Priority Data

Apr. 19, 2021   (CN) .......................... 202110417134.3

(51) Int. Cl.
*A61C 17/02*   (2006.01)
*A46B 9/04*    (2006.01)
(Continued)

(52) U.S. Cl.
CPC .............. *A61C 17/02* (2013.01); *A46B 9/045* (2013.01); *A46B 11/0086* (2013.01); *A46B 11/063* (2013.01); *A46B 2200/1066* (2013.01)

(58) Field of Classification Search
CPC ..... A61C 17/02; A61C 17/0211; A61C 17/22; A46B 9/045; A46B 11/0086; A46B 11/063
See application file for complete search history.

(56) References Cited

U.S. PATENT DOCUMENTS 3,401,690 A  *  9/1968  Martin .................... A61C 17/20
                                                    433/119
4,106,501 A  *  8/1978  Ozbey ................ A61C 17/0211
                                                    433/80
(Continued)

FOREIGN PATENT DOCUMENTS

CN         2351102      12/1999
CN       103402457      11/2013
(Continued)

OTHER PUBLICATIONS

"International Search Report (Form PCT/ISA/210) of PCT/CN2022/086793", mailed on Jun. 24, 2022, with English translation thereof, pp. 1-4.

*Primary Examiner* — Ralph A Lewis
(74) *Attorney, Agent, or Firm* — JCIPRNET (57) ABSTRACT

A smart oral cleaner includes a tooth-cleaning component, the tooth-cleaning component includes a first wall body and a second wall body, a hollow structure is formed between the first wall body and the second wall body, the second wall body is recessed towards the first wall body, the second wall body has a first wall surface and a second wall surface arranged opposite to one another, the first wall surface and the second wall surface are provided with jet holes, the second wall body has a shape adapted to a shape of a tooth, (Continued)

and an end surface of the tooth-cleaning component is in a shape of a slope-shaped depression.

10 Claims, 10 Drawing Sheets

(51) Int. Cl.
  *A46B 11/00* (2006.01)
  *A46B 11/06* (2006.01)

(56) References Cited

U.S. PATENT DOCUMENTS

| | | | | |
|---|---|---|---|---|
| 4,224,710 | A | * | 9/1980 | Solow .................. A61C 17/228 |
| | | | | 15/22.1 |
| 4,795,347 | A | * | 1/1989 | Maurer .................. A61C 17/38 |
| | | | | 15/22.1 |
| 5,800,367 | A | * | 9/1998 | Saxer .................. A61C 17/028 |
| | | | | 433/80 |
| 10,420,633 | B2 | * | 9/2019 | Pierce .................. A61C 17/224 |
| 11,135,042 | B2 | * | 10/2021 | Ouyang ............... A61C 17/022 |
| 2002/0152565 | A1 | | 10/2002 | Klupt |
| 2009/0208898 | A1 | * | 8/2009 | Kaplan .................. A46B 9/045 |
| | | | | 433/80 |
| 2012/0077144 | A1 | * | 3/2012 | Fougere ............. A61C 17/0211 |
| | | | | 433/82 |
| 2015/0024340 | A1 | * | 1/2015 | De Gentile ........ A61C 17/0211 |
| | | | | 433/82 |
| 2019/0231499 | A1 | * | 8/2019 | Laurent .............. A61C 17/0208 |

FOREIGN PATENT DOCUMENTS

| | | |
|---|---|---|
| CN | 104220023 | 12/2014 |
| CN | 106691613 | 5/2017 |
| CN | 106794055 | 5/2017 |
| CN | 107693145 | 2/2018 |
| CN | 110236717 | 9/2019 |
| CN | 212547223 | 2/2021 |
| CN | 213758669 | 7/2021 |

* cited by examiner

SMART ORAL CLEANER

CROSS-REFERENCE TO RELATED APPLICATION

This application is a 371 of international application of PCT application serial no. PCT/CN2022/086793, filed on Apr. 14, 2022, which claims the priority benefit of China application no. 202110417134.3, filed on Apr. 19, 2021. The entirety of each of the above mentioned patent applications is hereby incorporated by reference herein and made a part of this specification.

TECHNICAL FIELD

The present disclosure relates to the technical field of oral healthcare appliances, and in particular, to a smart oral cleaner.

BACKGROUND

At present, food that is sweet, sour, dark-colored, and so on in daily diet will cause problems such as demineralization, dentin hypersensitivity, and staining on the tooth surface. If the treatment is administrated during daily tooth brushing, the incidence of dental disease can be greatly reduced.

In the related art, oral healthcare involves cleaning of teeth and gums, tooth desensitization, tooth remineralization and tooth whitening, gingival massage, and the like. At present, tooth cleaning is mainly carried out by toothbrushes, dental floss, interdental brushes, oral irrigators, and the like, and gingival massage is mainly carried out by gum stimulators.

However, the above cleaning methods require manual operation on the teeth one by one, resulting in insufficient cleaning intensity of some teeth, which leads to an unsatisfactory tooth cleaning effect and low cleaning efficiency. In addition, some cleaning actions need to be completed with the tool being at a particular angle to the teeth and under an appropriate force. In this way, unnecessary mechanical damage may be caused to the teeth or gums when it is impossible to look directly inside the mouth during self-operated cleaning.

It should be noted that the information described above is merely for a better understanding of the background of the present disclosure, and therefore may include information of the prior art unknown to persons of ordinary skill in the art.

SUMMARY

An objective of the present disclosure is to provide a smart oral cleaner, in order to solve, at least to a certain extent, the problem of poor tooth cleaning efficiency due to limitations and shortcomings in the related art.

An embodiment of the present disclosure provides a smart oral cleaner, including a tooth-cleaning component, where the tooth-cleaning component includes a first wall body and a second wall body, a hollow structure is formed between the first wall body and the second wall body, the second wall body is recessed towards the first wall body, the second wall body has a first wall surface and a second wall surface arranged opposite to one another, the first wall surface and the second wall surface are provided with jet holes, the second wall body has a shape conforming to a shape of a tooth, and an end surface of the tooth-cleaning component is in a shape of a slope-shaped depression.

In an exemplary embodiment of the present disclosure, the second wall body further includes a third wall surface, the third wall surface is connected between the first wall surface and the second wall surface, and the third wall surface has a shape conforming to a shape of an occlusal surface of the tooth.

In an exemplary embodiment of the present disclosure, the third wall surface is provided with the jet holes.

In an exemplary embodiment of the present disclosure, the second wall body is an elastic deformation member.

In an exemplary embodiment of the present disclosure, the first wall body is provided with a guide hole, the guide hole is assembled with an outlet end of a liquid supply component, and a cleaning liquid container of the liquid supply component is configured to be in communication with the hollow structure.

In an exemplary embodiment of the present disclosure, the liquid supply component includes: a plurality of liquid storage bottles, where each of the plurality of liquid storage bottles is configured to hold a specified cleaning liquid; a plurality of liquid delivery branches, where each of the plurality of liquid delivery branches has a first end connected to a liquid delivery pipe and a second end connected to a liquid delivery end of a respective one of the liquid storage bottles; and a plurality of solenoid valves, where the plurality of solenoid valves are respectively disposed in the liquid delivery branches and configured for controlling an opening degree in the liquid delivery branches.

In an exemplary embodiment of the present disclosure, the smart oral cleaner further includes brush tube cluster structures, where the brush tube cluster structures are respectively assembled in the jet holes and the brush tube cluster structures extend from the hollow structure into the slope-shaped depression.

In an exemplary embodiment of the present disclosure, each of the brush tube cluster structures includes at least one tube, the tube is in communication with the hollow structure, a first end of the tube is assembled to a main body of the each of the brush tube cluster structures, and a second end of the tube extends into the slope-shaped depression.

In an exemplary embodiment of the present disclosure, the smart oral cleaner further includes retractable tubes, where a first limiting protrusion is provided at a first end of each of the retractable tubes, a second limiting protrusion is provided between a second end of each of the retractable tubes and the first end of each of the retractable tubes, the retractable tubes respectively extend through the jet holes in the second wall body, and the first limiting protrusion and the second limiting protrusion are respectively disposed on two sides of the second wall body to limit a moving distance of each of the retractable tubes in the second wall body.

In an exemplary embodiment of the present disclosure, an opening of a jet hole of the jet holes which is near a bottom of the slope-shaped depression is smaller than an opening of a jet hole of the jet holes which is near an open end of the slope-shaped depression, and/or an opening of each of the jet holes is in a positive correlation with an accommodation size of the slope-shaped depression, and/or a distribution density of the jet holes is in a positive correlation with the accommodation size of the slope-shaped depression.

In an exemplary embodiment of the present disclosure, a quantity of the jet holes is in a positive correlation with the accommodation size of the slope-shaped depression.

In an exemplary embodiment of the present disclosure, one of the second wall body and the first wall body is provided with a limiting protrusion, and the other one of the second wall body and the first wall body is provided with a limiting groove, and the limiting protrusion and the limiting groove are configured to be adaptively assembled or disassembled.

In an exemplary embodiment of the present disclosure, the smart oral cleaner further includes a sealing structure, where the sealing structure is provided between the limiting groove and the limiting protrusion and configured for filling a gap between the limiting groove and the limiting protrusion.

In an exemplary embodiment of the present disclosure, the smart oral cleaner further includes a magnetic attraction component, where a first magnetic structure of the magnetic attraction component is disposed on the limiting groove, and a second magnetic structure of the magnetic attraction component is disposed on the limiting protrusion, and the magnetic attraction component is configured to allow the limiting groove to be assembled with the limiting protrusion through a magnetic attraction.

In an exemplary embodiment of the present disclosure, at least one side of the first wall body is provided with a spray hole.

In an exemplary embodiment of the present disclosure, the smart oral cleaner further includes a spray head, where the spray head is detachably assembled on an outer surface of the first wall body, and an outlet of the spray head is in communication with the hollow structure.

In an exemplary embodiment of the present disclosure, the smart oral cleaner further includes the liquid supply component, where a first end of the liquid supply component is rotatably assembled to the first wall body and a second end of the liquid supply component is in communication with a liquid supply member, the liquid supply component is provided with a unidirectional switch, and the unidirectional switch is configured for guiding a liquid from the liquid supply member to the hollow structure.

In an exemplary embodiment of the present disclosure, the smart oral cleaner further includes a filtering component, where the filtering component is disposed in the liquid delivery pipe between the liquid supply component and the tooth-cleaning component and configured for filtering the cleaning liquid in the liquid delivery pipe.

In an exemplary embodiment of the present disclosure, the smart oral cleaner further includes an abrasive material component, where an accommodating cavity of the abrasive material component is configured for placing an abrasive material, and the liquid delivery pipe between the liquid supply component and the tooth-cleaning component is configured to be in communication with the accommodating cavity of the abrasive material component.

In an exemplary embodiment of the present disclosure, the smart oral cleaner further includes a material-liquid mixing member, where a first input end of the material-liquid mixing member is connected to a nozzle, a second input end of the material-liquid mixing member is connected to an outlet of the accommodating cavity of the abrasive material component, and an output end of the material-liquid mixing member is in communication with the hollow structure of the tooth-cleaning component through the liquid delivery pipe.

In an exemplary embodiment of the present disclosure, the smart oral cleaner further includes a pressure regulating valve, where the pressure regulating valve is disposed in the liquid supply component, and an opening degree of the pressure regulating valve is in a positive correlation with a liquid delivery rate in the liquid supply component and/or the opening degree of the pressure regulating valve is in a positive correlation with a liquid delivery pressure in the liquid supply component.

In an exemplary embodiment of the present disclosure, the smart oral cleaner further includes a microfluidic detector, where the microfluidic detector is disposed in the hollow structure or is disposed on the second wall body or on the first wall body, and is configured for detecting information about types of particles in an environment of the tooth and feeding back the information about the types of the particles to the pressure regulating valve.

In an exemplary embodiment of the present disclosure, the smart oral cleaner further includes a micro camera, where the micro camera is disposed on the second wall body or on the first wall body and is configured for detecting image information of the environment of the tooth.

In the technical solutions according to the embodiments of the present disclosure, the tooth-cleaning component includes the first wall body and the second wall body, the hollow structure is formed between the first wall body and the second wall body, and the tooth is rinsed with the cleaning liquid in the hollow structure through the jet holes in the second wall body. The shape of the second wall body is conforming to the shape of the tooth. When the tooth-cleaning component is placed on the tooth for cleaning, the complexity and difficulty of adjusting the angle of the tooth-cleaning component are reduced. Therefore, the use of the oral cleaner is simplified and thorough and efficient cleaning of the tooth is achieved.

Further, the first wall body is provided with the guide hole, the guide hole is assembled with the outlet end of the liquid supply component, the cleaning liquid in the liquid supply component may be, but not limited to, a liquid for whitening, anti-inflammatory, desensitization, and remineralization treatment, and in turn, through the jet holes in the tooth-cleaning component, the cleaning liquid is used for comprehensive tooth healthcare including whitening, anti-inflammatory, sterilization, desensitization, and remineralization treatment, so that the provided smart oral cleaner integrates conventional separate devices for tooth brushing, rinsing, desensitization, and whitening.

It should be understood that the above general description and the following detailed description are exemplary and explanatory only, and are not intended to limit the present disclosure.

BRIEF DESCRIPTION OF THE DRAWINGS

The accompanying drawings, incorporated in and constituting a part of this specification, illustrate embodiments consistent with the present disclosure and serve, together with this specification, to explain the principle of the present disclosure. Apparently, the accompanying drawings in the following description show merely some embodiments of the present disclosure, and persons of ordinary skill in the art can derive other drawings from the accompanying drawings without creative efforts.

DETAILED DESCRIPTION OF THE EMBODIMENTS

Exemplary embodiments will be described more comprehensively below with reference to the accompanying drawings. The exemplary embodiments can be implemented in various ways and shall not be construed as limitations to the present disclosure. On the contrary, these embodiments are provided to make the present disclosure more comprehensive and complete, and fully convey the concepts of the exemplary embodiments to persons skilled in the art. The described features, structures, or characteristics can be combined in any suitable way in one or more embodiments. In the descriptions below, the embodiments of the present disclosure can be fully understood from many specific details. However, persons skilled in the art will realize that the technical solution of the present disclosure can be implemented without one or more of the specific details, or other components, devices, smart oral cleaners, and so on can be employed. In other circumstances, well-known technical solutions are not shown or described in detail to avoid distraction and make the present disclosure clearer.

In addition, the accompanying drawings are merely schematic illustrations of the present disclosure. The same reference signs in the accompanying drawings indicate the same or similar parts and they will not be repeatedly described. Some of the block diagrams shown in the accompanying drawings represent functional entities and are not necessarily corresponding to physically or logically independent entities. These functional entities can be implemented by software, or implemented in one or more hardware modules or integrated circuits, or implemented in different networks and/or processor devices and/or microcontroller devices.

The exemplary embodiments of the present disclosure will be described in detail below with reference to FIG. 1 to FIG. 15.

Figure 1:
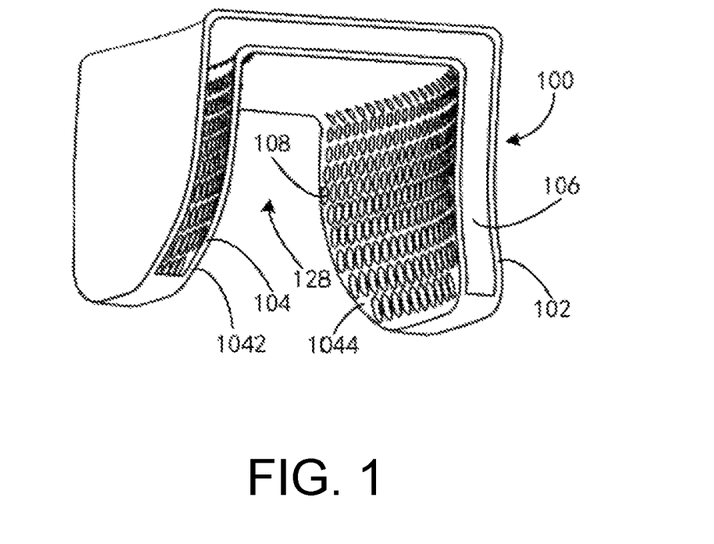
FIG. 1 is a schematic diagram of a smart oral cleaner in an exemplary embodiment of the present disclosure.
Figure 2:
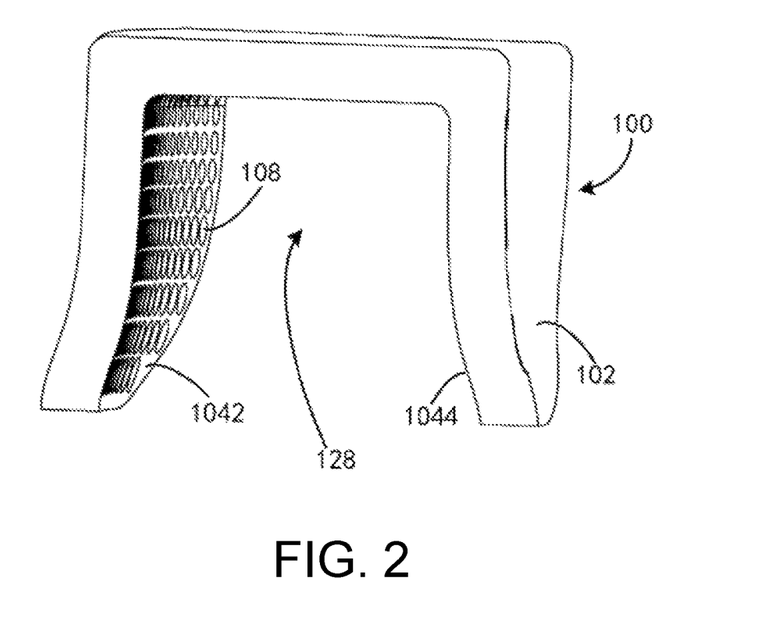
FIG. 2 is a schematic diagram of another smart oral cleaner in an exemplary embodiment of the present disclosure.

As shown in FIG. 1 (assembly view) and FIG. 2 (sectional view), the smart oral cleaner in an embodiment of the present disclosure includes a tooth-cleaning component 100. The tooth-cleaning component 100 includes a first wall body 102 and a second wall body 104. A hollow structure 106 is formed between the first wall body 102 and the second wall body 104. The second wall body 104 is recessed towards the first wall body 102. The second wall body 104 has a first wall surface 1042 and a second wall surface 1044 arranged opposite to one another. The first wall surface 1042 and the second wall surface 1044 are provided with jet holes 108. The shape of the second wall body 104 is conforming to the shape of the tooth. An end surface of the tooth-cleaning component 100 is in a shape of a slope-shaped depression 128.

In an exemplary embodiment of the present disclosure, the tooth-cleaning component 100 includes the first wall body 102 and the second wall body 104. The first wall body 102 and the second wall body 104 are detachably or non-detachably assembled, and the present disclosure is not limited thereto.

In the embodiment, the tooth-cleaning component 100 includes the first wall body 102 and the second wall body 104, the hollow structure 106 is formed between the first wall body 102 and the second wall body 104, and the tooth is rinsed with the cleaning liquid in the hollow structure 106 through the jet holes 108 in the second wall body 104. As the shape of the second wall body 104 is conforming to the shape of the tooth, the tooth-cleaning component 100 can slide along the dental arch to the position of the tooth to be rinsed, which reduces the complexity and difficulty of adjusting the angle of the tooth-cleaning component 100. Therefore, the use of the oral cleaner is simplified and thorough and efficient cleaning of the tooth is achieved.

It is worth pointing out that, as shown in FIG. 1 and FIG. 2, the first wall surface 1042 and the second wall surface 1044 are arranged opposite to one another, and the first wall surface 1042 and the second wall surface 1044 are provided with the jet holes 108. That is, the tooth is rinsed with the liquid from the jet holes 108 on two sides of the tooth at the same time, which improves the tooth cleaning efficiency.

The cleaning liquid in the hollow structure 106 may be, but not limited to, a liquid for whitening, anti-inflammatory, desensitization, and remineralization treatment. The cleaning liquid is used for comprehensive tooth healthcare including whitening, anti-inflammatory, desensitization, and remineralization treatment through the jet holes 108 in the tooth-cleaning component 100, so that the provided smart oral cleaner integrates conventional separate devices for tooth brushing, rinsing, desensitization, and whitening.

In an embodiment, the cleaning liquid includes 1 to 2 parts by weight of salt, 0.5 to 1 part by weight of a household desensitizer, 0.5 to 1 part by weight of a mineralization solution, 0.3 to 0.6 parts by weight of a whitening agent, and 25 to 30 parts by weight of purified water, which are stirred until they are completely dissolved.

The household desensitizer may be a desensitization gargle, the mineralization solution may be a fluoride mouthwash, and the whitening agent may be a whitening mouthwash.

In an exemplary embodiment of the present disclosure, the distance between the second wall body 104 and the edge of the gum is in a range of 0.1 mm to 5 mm.

Further, the second wall body 104 is detachably assembled with the first wall body 102, the second wall body 104 can be replaced according to different tooth-cleaning requirements, and the shape of the second wall body 104 is conforming to the shape of the permanent tooth or the shape of the second wall body 104 is conforming to the shape of the deciduous tooth.

In an exemplary embodiment of the present disclosure, the second wall body 104 covers one or more teeth.

In an exemplary embodiment of the present disclosure, the second wall body 104 and the first wall body 102 can be conveniently disassembled for the cleaning and maintenance of the hollow structure 106.

In an exemplary embodiment of the present disclosure, when a failure is caused by damage of the second wall body 104 or the first wall body 102, only the failed part needs to be replaced, which reduces the use and maintenance costs.

Figure 3:
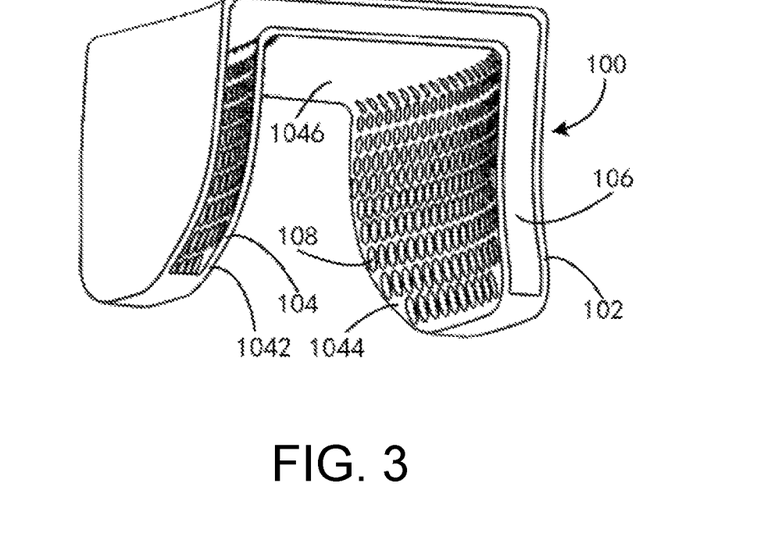
FIG. 3 is a schematic diagram of another smart oral cleaner in an exemplary embodiment of the present disclosure.

As shown in FIG. 3, in an exemplary embodiment of the present disclosure, the second wall body 104 further includes a third wall surface 1046, the third wall surface 1046 is connected between the first wall surface 1042 and the second wall surface 1044, and the shape of the third wall surface 1046 is conforming to the shape of the occlusal surface of the tooth.

In an exemplary embodiment of the present disclosure, the third wall surface 1046 is provided with the jet holes 108.

In the embodiment, the third wall surface 1046 is provided with the jet holes 108 to rinse the occlusal surface of the tooth, which reduces the probability of caries in the grooves on the occlusal surface of the molar.

In an exemplary embodiment of the present disclosure, the second wall body 104 is an elastic deformation member.

In the embodiment, since the second wall body 104 is an elastic deformation member, when the tooth-cleaning component 100 is placed on the tooth, the shape of the second wall body 104 changes with the shape of the tooth, so that the tooth-cleaning component 100 is applicable in a wider range.

In an exemplary embodiment of the present disclosure, the opening of the jet holes 108 in the third wall surface 1046 is smaller than the opening of the jet holes 108 in the first wall surface 1042, and the opening of the jet holes 108 in the third wall surface 1046 is smaller than the opening of the jet holes 108 in the second wall surface 1044. That is, compared with the first wall surface 1042 and the second wall surface 1044, the jet holes 108 in the third wall surface 1046 provide the highest rinsing pressure.

In an exemplary embodiment of the present disclosure, the distribution density of the jet holes 108 in the third wall surface 1046 is greater than the distribution density of the jet holes 108 in the first wall surface 1042, and the distribution density of the jet holes 108 in the third wall surface 1046 is greater than the distribution density of the jet holes 108 in the second wall surface 1044. That is, compared with the first wall surface 1042 and the second wall surface 1044, the jet holes 108 in the third wall surface 1046 provide the largest volume of the rinsing liquid.

In an exemplary embodiment of the present disclosure, the first wall body 102 is provided with a guide hole 1102, the guide hole 1102 is assembled with an outlet end of a liquid supply component, and a cleaning liquid container of the liquid supply component is configured to be in communication with the hollow structure 106.

In the embodiment, the first wall body 102 is provided with the guide hole 1102, the guide hole 1102 is assembled with the outlet end of the liquid supply component, and the cleaning liquid is stored or flows in the liquid supply component.

In an exemplary embodiment of the present disclosure, the guide hole 1102 and the outlet end of the liquid supply component are assembled through a rotating connector 110. That is, the outlet end can rotate 0° to 360° relative to the tooth-cleaning component 100.

Figure 4:
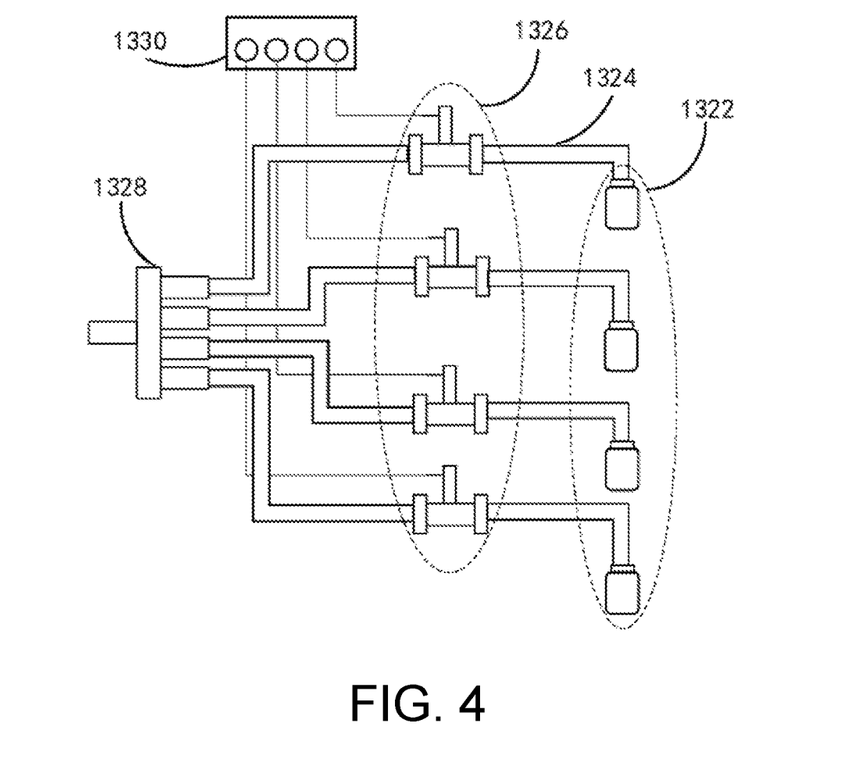
FIG. 4 is a schematic diagram of another smart oral cleaner in an exemplary embodiment of the present disclosure.

As shown in FIG. 4, in an exemplary embodiment of the present disclosure, the liquid supply component includes: a plurality of liquid storage bottles 1322, where each of the plurality of liquid storage bottles 1322 is configured to hold a specified cleaning liquid; a plurality of liquid delivery branches 1324, where each of the plurality of liquid delivery branches 1324 has a first end connected to a liquid delivery pipe and a second end connected to a liquid delivery end of a respective one of the liquid storage bottles 1322; and a plurality of solenoid valves 1326, where the plurality of solenoid valves 1326 are respectively disposed in the liquid delivery branches 1324 and configured for controlling an opening degree in the liquid delivery branches 1324.

In the embodiment, the liquid storage bottles 1322 of the liquid supply component are configured for storing different cleaning liquids, and the cleaning liquids can be provided to the tooth-cleaning component 100 in order or in a variety of mixtures, which diversifies the cleaning modes of the tooth-cleaning component 100 and improves the tooth cleaning effect of the tooth-cleaning component 100.

As shown in FIG. 4, in an exemplary embodiment of the present disclosure, the solenoid valves 1326 are controlled by at least one relay, and a plurality of relays can be integrated into one relay module 1330. The relay module 1330 controls the on/off sequence of each relay to determine the liquid supply volume, order, frequency, and the like of each of the liquid delivery branches 1324, and the present disclosure is not limited thereto.

As shown in FIG. 4, in an exemplary embodiment of the present disclosure, the second ends of the liquid delivery branches 1324 are gathered at a five-way valve 1328.

Figure 5:
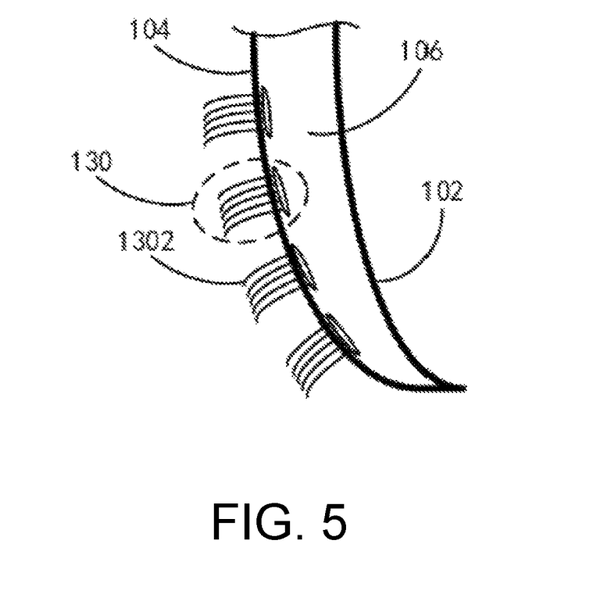
FIG. 5 is a block diagram of another smart oral cleaner in an exemplary embodiment of the present disclosure.

As shown in FIG. 5, in an exemplary embodiment of the present disclosure, the smart oral cleaner further includes brush tube cluster structures 130. The brush tube cluster structures 130 are respectively assembled in the jet holes 108 and the brush tube cluster structures 130 extend from the hollow structure 106 into the slope-shaped depression 128.

In the embodiment, the tooth is rinsed with the cleaning liquid in the hollow structure 106 through tubes 1302 in the brush tube cluster structures 130, and the tubes 1302 swing during the flow of the cleaning liquid to brush and rinse the tooth at the same time, thereby further improving the tooth cleaning effect and cleaning efficiency.

As shown in FIG. 5, in an exemplary embodiment of the present disclosure, each of the brush tube cluster structures 130 includes at least one tube 1302, the tube 1302 is in communication with the hollow structure 106, a first end of the tube 1302 is assembled to a main body of the each of the brush tube cluster structures 130, and a second end of the tube 1302 extends into the slope-shaped depression 128.

In an exemplary embodiment of the present disclosure, an opening of a jet hole 108 of the jet holes 108 which is near a bottom of the slope-shaped depression 128 is smaller than an opening of a jet hole 108 of the jet holes 108 which is near an open end of the slope-shaped depression 128, and/or an opening of each of the jet holes 108 is in positive correlation with an accommodation size of the slope-shaped depression 128, and/or a distribution density of the jet holes 108 is in positive correlation with the accommodation size of the slope-shaped depression 128.

Figure 6:
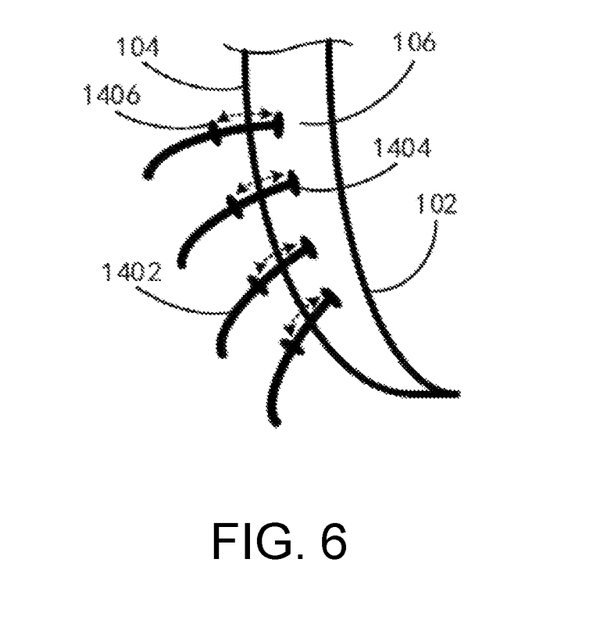
FIG. 6 is a schematic diagram of another smart oral cleaner in an exemplary embodiment of the present disclosure.

As shown in FIG. 6, in an exemplary embodiment of the present disclosure, the smart oral cleaner further includes retractable tubes 1402. A first limiting protrusion 1404 is provided at a first end of each of the retractable tubes 1402, and a second limiting protrusion 1406 is provided between a second end of each of the retractable tubes 1402 and the first end of each of the retractable tubes 1402. The retractable tubes 1402 respectively extend through the jet holes 108 in the second wall body 104, and the first limiting protrusion 1404 and the second limiting protrusion 1406 are respectively disposed on two sides of the second wall body 104 to limit the moving distance of each of the retractable tubes 1402 in the second wall body 104.

In the embodiment, each of the retractable tubes 1402 is provided with the first limiting protrusion 1404 and the second limiting protrusion 1406, and the first limiting protrusion 1404 and the second limiting protrusion 1406 are respectively disposed on two sides of the second wall body 104. That is, the relative movement of each of the retractable tubes 1402 is limited by the first limiting protrusion 1404 and the second limiting protrusion 1406. The retractable tubes 1402 move forward and backward in the slope-shaped depression 128 to support and rub against the tooth for tooth cleaning. Besides, the tooth can also be rinsed with the cleaning liquid in the hollow structure 106 through the retractable tubes 1402.

The retractable tube 1402 is not limited to a tube that can extend or retract in length, and instead, the length of the retractable tube can remain unchanged. The first limiting protrusion 1404 and the second limiting protrusion 1406 allow the retractable tube 1402 to be pushed into the slope-shaped depression 128 or pulled back into the hollow structure 106, so that the retractable tube 1402 is better conforming to different tooth shapes of users, which further improves the cleaning effect of the tooth-cleaning component 100.

In an exemplary embodiment of the present disclosure, the opening of the jet holes 108 near the bottom of the slope-shaped depression 128 is smaller than the opening of the jet holes 108 near the open end of the slope-shaped depression 128.

In an exemplary embodiment of the present disclosure, the tube 1302 is a hollow flexible tube allowing the cleaning liquid to flow through, and the flexible tube 1302 further reduces the impact on the tooth.

The opening shape of the jet holes 108 can be regular or irregular. The regular shapes include, but are not limited to, circular, elliptical, rectangular, rhombic, trapezoidal, hexagonal, and five-pointed star shapes.

In the embodiment, the open end of the slope-shaped depression 128 is close to the gum and the bottom of the slope-shaped depression 128 is corresponding to the occlusal surface of the tooth. That is, the opening of the jet holes corresponding to the gum is the largest to reduce the rinsing impact on the gum and avoid gum bleeding. Further, the opening of the jet holes corresponding to the occlusal surface is smaller, and the opening of the jet holes corresponding to the embrasure is the smallest.

In an exemplary embodiment of the present disclosure, the opening of each of the jet holes 108 is in positive correlation with the accommodation size of the slope-shaped depression 128.

In the embodiment, when the tooth to be accommodated by the slope-shaped depression 128 is larger, the opening of each of the jet holes 108 is larger, and correspondingly, when the tooth to be accommodated by the slope-shaped depression 128 is smaller, the opening of each of the jet holes 108 is smaller.

In an exemplary embodiment of the present disclosure, the distribution density of the jet holes 108 is in positive correlation with the accommodation size of the slope-shaped depression 128.

In the embodiment, the distribution density of the jet holes 108 is in positive correlation with the accommodation size of the slope-shaped depression 128. Therefore, when the tooth to be accommodated by the slope-shaped depression 128 is larger, the distribution density of the jet holes 108 is larger, and when the tooth to be accommodated by the slope-shaped depression 128 is smaller, the distribution density of the jet holes 108 is smaller.

In an exemplary embodiment of the present disclosure, the quantity of the jet holes 108 is in positive correlation with the accommodation size of the slope-shaped depression 128.

In the embodiment, the quantity of the jet holes 108 is in positive correlation with the accommodation size of the slope-shaped depression 128. Therefore, when the tooth to be accommodated by the slope-shaped depression 128 is larger, the quantity of the jet holes 108 is larger, and when the tooth to be accommodated by the slope-shaped depression 128 is smaller, the quantity of the jet holes 108 is smaller.

Figure 7:
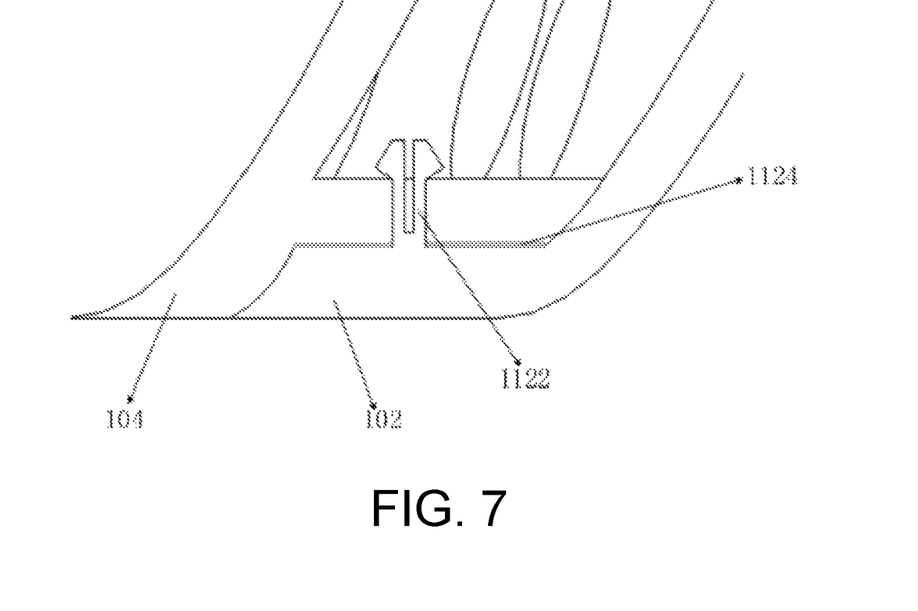
FIG. 7 is a schematic diagram of another smart oral cleaner in an exemplary embodiment of the present disclosure.

As shown in FIG. 7, in an exemplary embodiment of the present disclosure, one of the second wall body 104 and the first wall body 102 is provided with a limiting protrusion, and the other one of the second wall body 104 and the first wall body 102 is provided with a limiting groove, and the limiting protrusion and the limiting groove are configured to be adaptively assembled or disassembled.

In an exemplary embodiment of the present disclosure, the limiting groove and the limiting protrusion 1122 serve as a detachable component 112 to realize the assembly of the second wall body 104 and the first wall body 102, and a buckling structure can be adopted. Therefore, the shapes of the second wall body 104 and the first wall body 102 can be adjusted, which improves the applicability and versatility of the tooth-cleaning component 100.

In addition, concentric threaded holes can be arranged at relative positions of the second wall body 104 and the first wall body 102, and the second wall body 104 and the first wall body 102 are in threaded connection through screws and threaded holes.

In the embodiment, one of the second wall body 104 and the first wall body 102 is provided with the limiting protrusion 1122, and the other one of the second wall body 104 and the first wall body 102 is provided with the limiting groove, and the limiting protrusion 1122 and the limiting groove are configured to be adaptively assembled or disassembled, so that the smart oral cleaner is applicable to teeth of different sizes and is easily disassembled for cleaning to improve the cleanliness of the hollow structure 106. In addition, the brush tube cluster structures 130 can also be replaced or cleaned by disassembling the second wall body 104.

Figure 8:
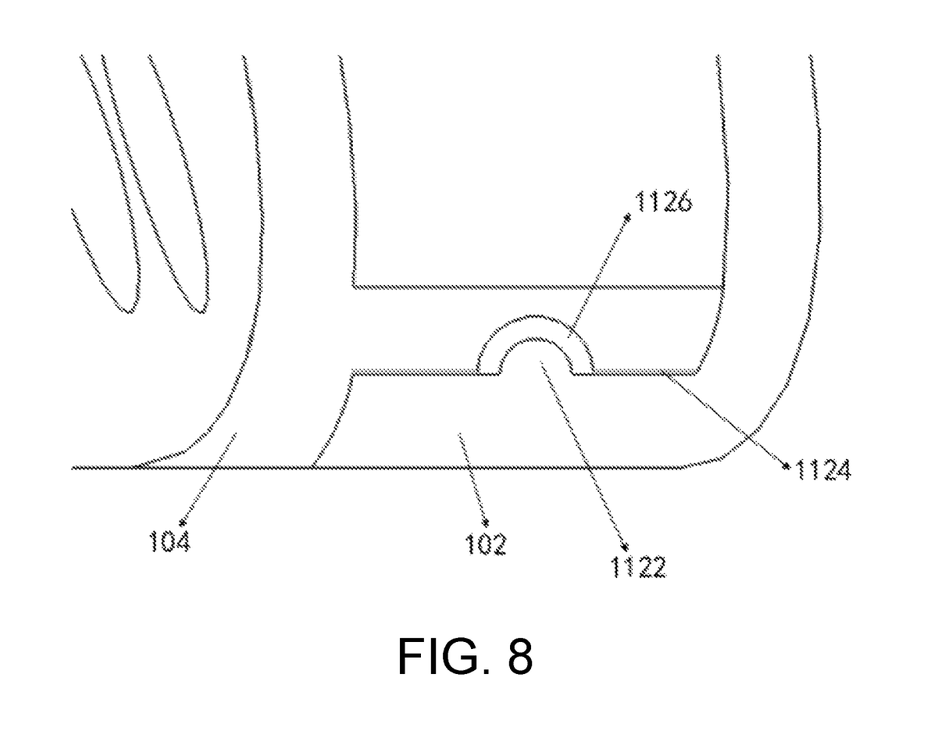
FIG. 8 is a schematic diagram of another smart oral cleaner in an exemplary embodiment of the present disclosure.

As shown in FIG. 7 and FIG. 8, in an exemplary embodiment of the present disclosure, the smart oral cleaner further includes a sealing structure 1124, where the sealing structure 1124 is provided between the limiting groove and the limiting protrusion 1122 and configured for filling the gap between the limiting groove and the limiting protrusion 1122.

In the embodiment, the sealing structure 1124 is arranged between the limiting groove and the limiting protrusion 1122 to improve the sealing performance of the hollow structure 106. The sealing structure 1124 also reduces friction and collision between the limiting groove and the limiting protrusion 1122, thereby reducing the probability of damages to the components.

In an exemplary embodiment of the present disclosure, the sealing structure 1124 is, but not limited to, a silicone strip or silicone layer.

As shown in FIG. 8, in an exemplary embodiment of the present disclosure, the smart oral cleaner further includes a magnetic attraction component 1126. A first magnetic structure of the magnetic attraction component 1126 is disposed on the limiting groove, and a second magnetic structure of the magnetic attraction component 1126 is disposed on the limiting protrusion 1122, and the magnetic attraction component 1126 is configured to allow the limiting groove to be assembled with the limiting protrusion 1122 through magnetic attraction.

In the embodiment, the limiting groove and the limiting protrusion 1122 are assembled through the two magnetic attraction structures of the magnetic attraction component 1126, which further simplifies the disassembly steps and assembly modes between the limiting groove and the limiting protrusion 1122.

Figure 9:
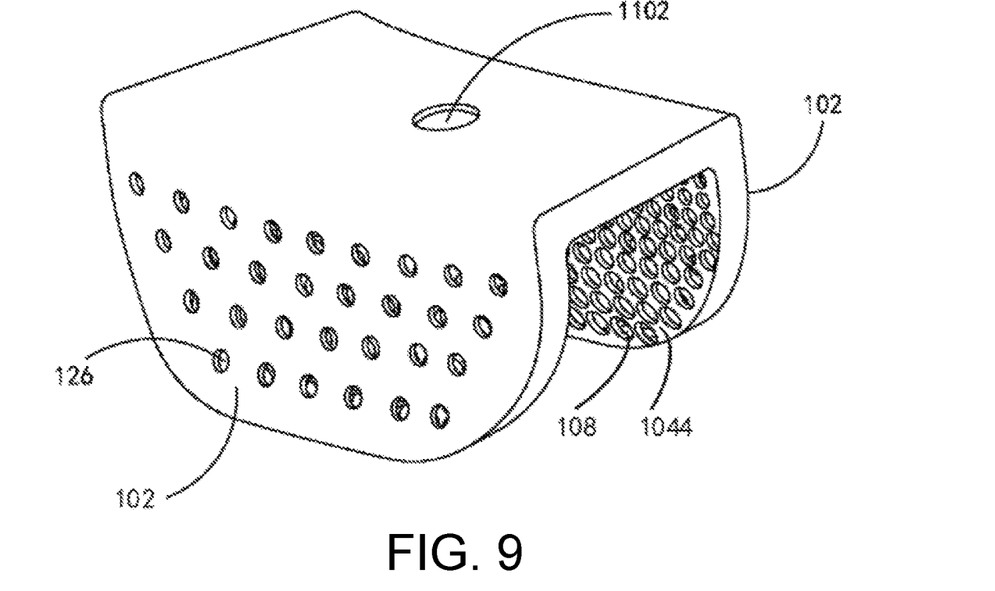
FIG. 9 is a schematic diagram of another smart oral cleaner in an exemplary embodiment of the present disclosure.
Figure 10:
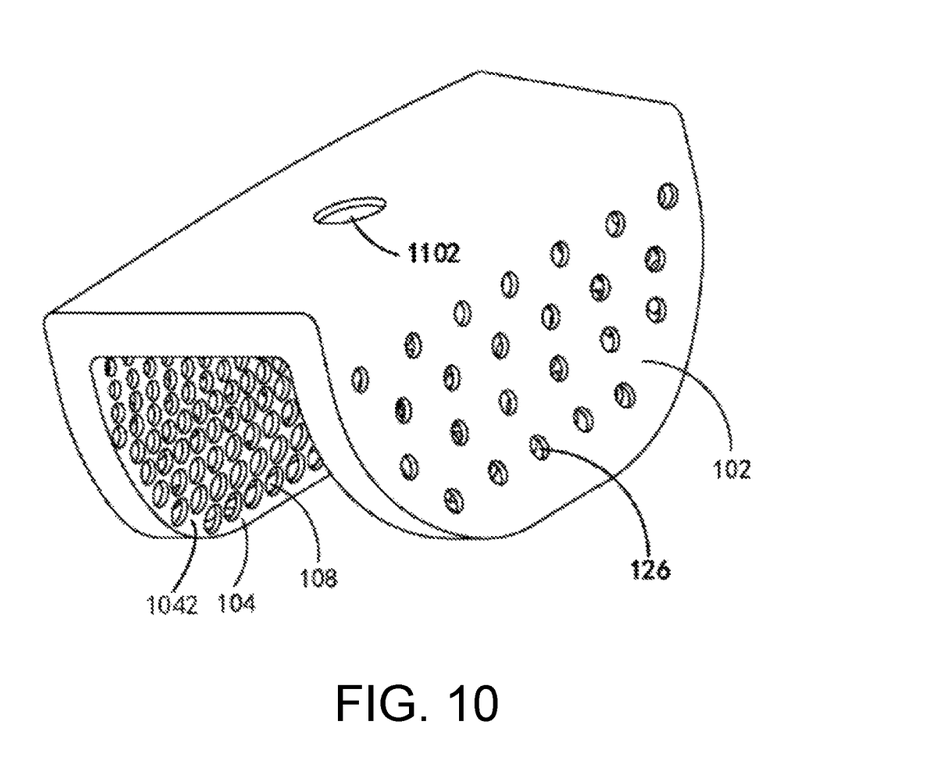
FIG. 10 is a schematic diagram of another smart oral cleaner in an exemplary embodiment of the present disclosure.
Figure 11:
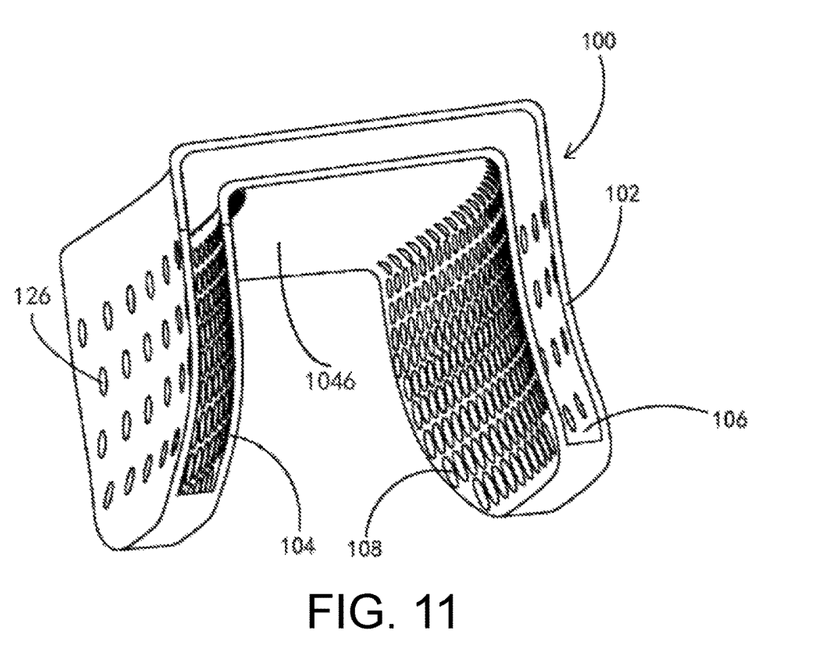
FIG. 11 is a block diagram of another smart oral cleaner in an exemplary embodiment of the present disclosure.

As shown in FIG. 9, FIG. 10, and FIG. 11, in an exemplary embodiment of the present disclosure, at least one side of the first wall body 102 is provided with a spray hole 126.

In the embodiment, the spray hole 126 provided on at least one side of the first wall body 102 is configured for rinsing of the palate and tongue to improve the overall cleanliness of the oral cavity.

In an exemplary embodiment of the present disclosure, the smart oral cleaner further includes a spray head (not shown). The spray head is detachably assembled on an outer surface of the first wall body 102, and an outlet of the spray head is in communication with the hollow structure 106.

In the embodiment, the smart oral cleaner includes the spray head (not shown), and the rinsing direction of the cleaning liquid can be adjusted by rotating the spray head without precise adjustment of the position and direction of the tooth-cleaning component 100, which simplifies the tooth-cleaning operation.

Figure 12:
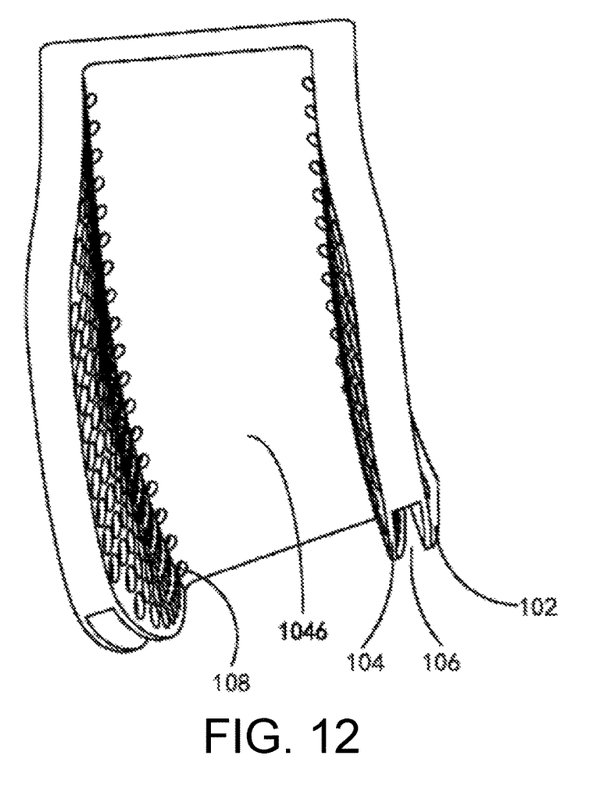
FIG. 12 is a schematic diagram of another smart oral cleaner in an exemplary embodiment of the present disclosure.
Figure 13:
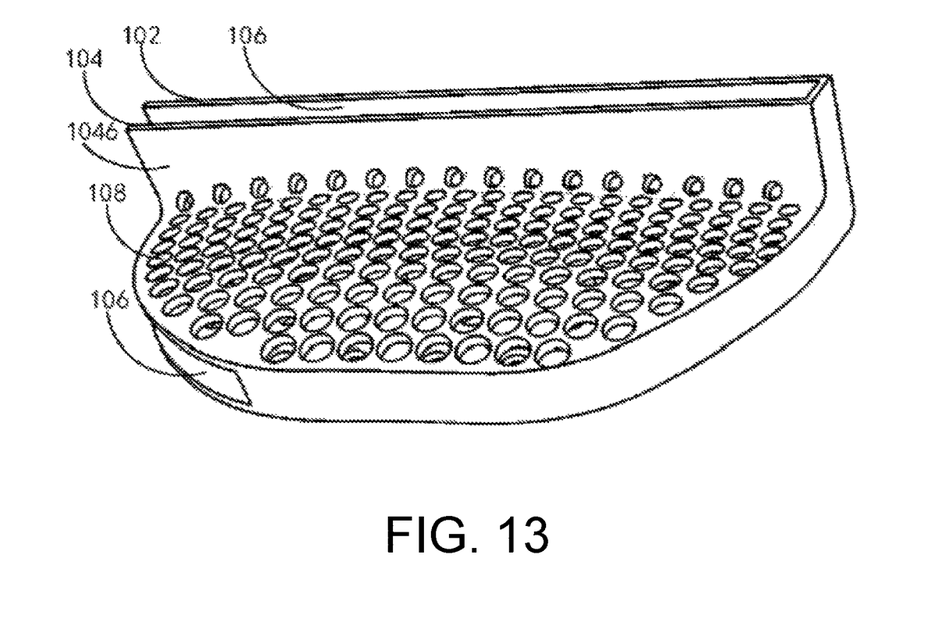
FIG. 13 is a schematic diagram of another smart oral cleaner in an exemplary embodiment of the present disclosure.
Figure 14:
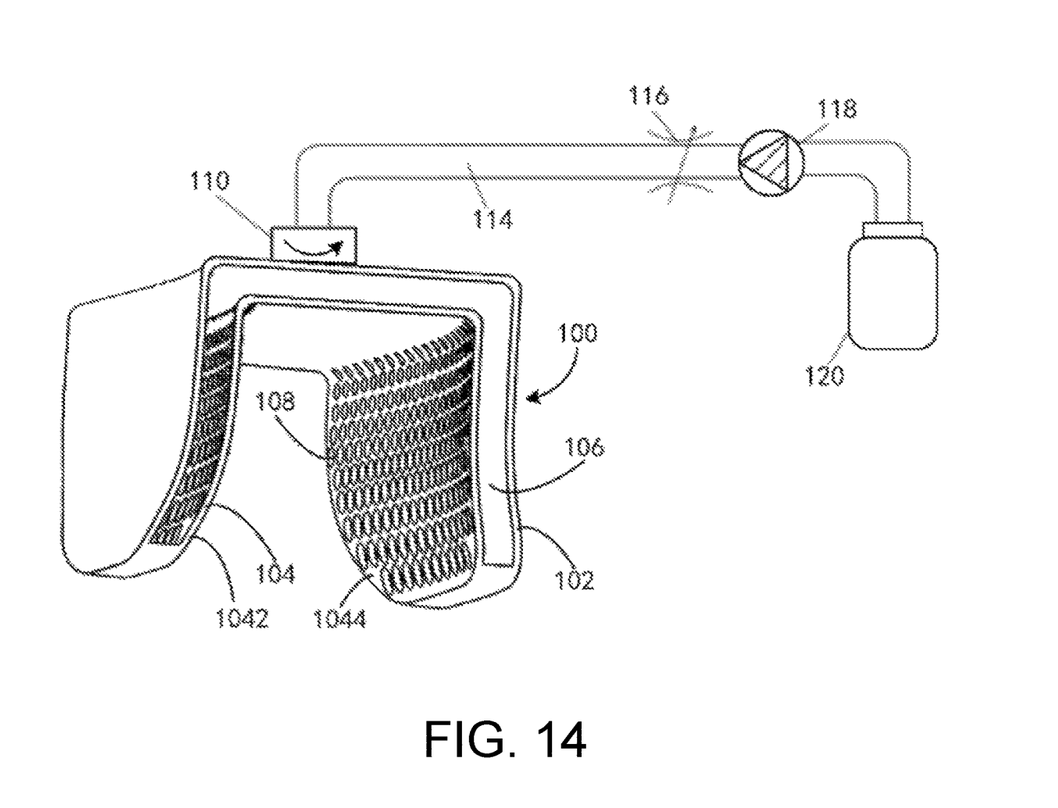
FIG. 14 is a schematic diagram of another smart oral cleaner in an exemplary embodiment of the present disclosure.

As shown in FIG. 12 and FIG. 13, in an exemplary embodiment of the present disclosure, the third wall surface 1046 may be not provided with the jet holes 108.

As shown in FIG. 14, FIG. 15, FIG. 16, and FIG. 17, in an exemplary embodiment of the present disclosure, the smart oral cleaner further includes the liquid supply component. A first end of the liquid supply component is rotatably assembled to the first wall body 102 and a second end of the liquid supply component is in communication with a liquid supply member 120. The liquid supply component is provided with a unidirectional switch 118, and the unidirectional switch 118 is configured for guiding the liquid from the liquid supply member 120 to the hollow structure 106.

In the embodiment, the liquid supply component includes the unidirectional switch 118 and a guide pipe 114, which reduces the backflow of the cleaning liquid in the hollow structure 106 or the guide pipe 114 to the liquid supply component, improves the cleanliness of the cleaning liquid in the liquid supply component, and reduces the breeding of bacteria in the smart oral cleaner.

Figure 15:
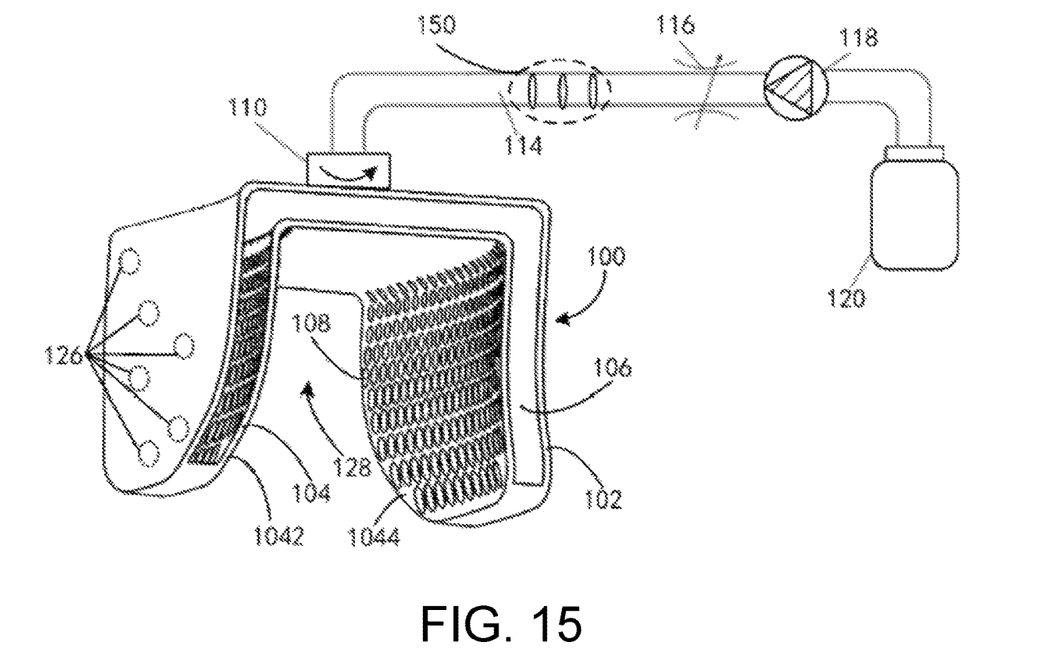
FIG. 15 is a schematic diagram of another smart oral cleaner in an exemplary embodiment of the present disclosure.

As shown in FIG. 15, in an exemplary embodiment of the present disclosure, the smart oral cleaner further includes a filtering component 150, where the filtering component 150 is disposed in the liquid delivery pipe between the liquid supply component and the tooth-cleaning component 100 and configured for filtering the cleaning liquid in the liquid delivery pipe.

In the embodiment, the filtering component 150 is provided to filter the cleaning liquid flowing into the hollow structure 106 of the tooth-cleaning component 100, which effectively reduces the impurities, bacteria, and macromolecular particles in the cleaning liquid, reduces the probability of the blocking of the jet holes, improves the cleanliness of the tooth-cleaning component, and reduces the growth of bacteria in the tooth-cleaning component.

As shown in FIG. 15, the section of the slope-shaped depression 128 is U-shaped or is of an inverted trapezoidal structure with an open long side.

Figure 16:
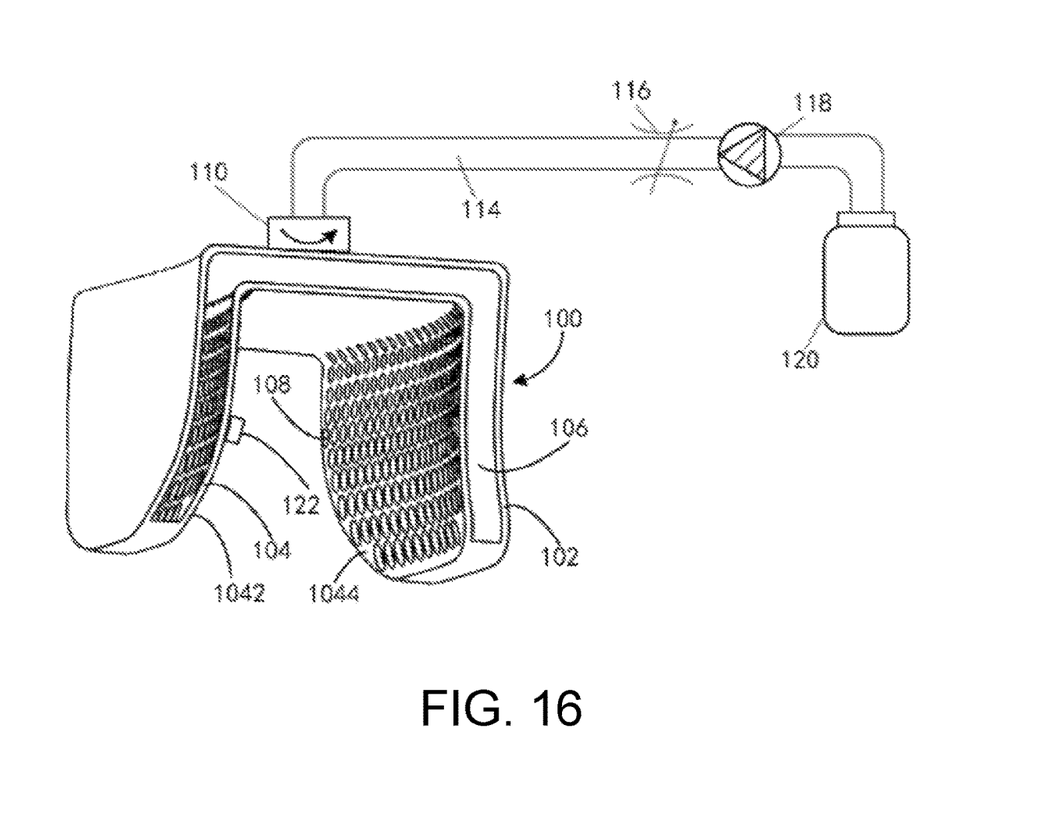
FIG. 16 is a block diagram of another smart oral cleaner in an exemplary embodiment of the present disclosure.

As shown in FIG. 16, in an exemplary embodiment of the present disclosure, the smart oral cleaner further includes a passive micro camera 122. The micro camera 122 is disposed on the second wall body 104 or on the first wall body 102 and is configured for detecting image information of the environment of the tooth.

In the embodiment, the passive micro camera 122 is disposed on the second wall body 104 or on the first wall body 102 and is configured for detecting image information of the environment of the tooth, so that the defects, caries, bleeding, and the like of the tooth can be determined accordingly and the oral healthcare effect is further improved.

Figure 17:
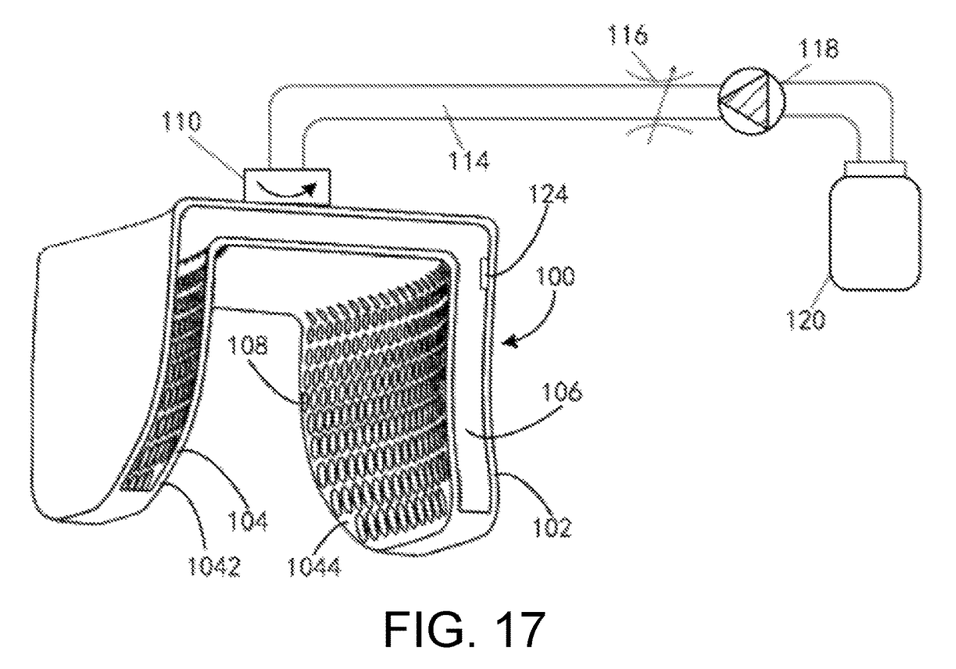
FIG. 17 is a schematic diagram of another smart oral cleaner in an exemplary embodiment of the present disclosure.

As shown in FIG. 17, in an exemplary embodiment of the present disclosure, the smart oral cleaner further includes a microfluidic detector 124. The microfluidic detector 124 is disposed in the hollow structure 106 or is disposed on the second wall body 104 or on the first wall body 102, and is configured for detecting the types of particles in the environment of the tooth.

In the embodiment, the microfluidic detector 124 is disposed in the hollow structure 106 or is disposed on the second wall body 104 or on the first wall body 102, and is configured for detecting the types of particles in the environment of the tooth. The types of particles include, but are not limited to, cells, bacteria, and viruses. Therefore, during the tooth-cleaning process, the health of the oral environment can be determined based on the types of particles in the cleaning liquid, thereby improving the oral healthcare effect.

Figure 18:
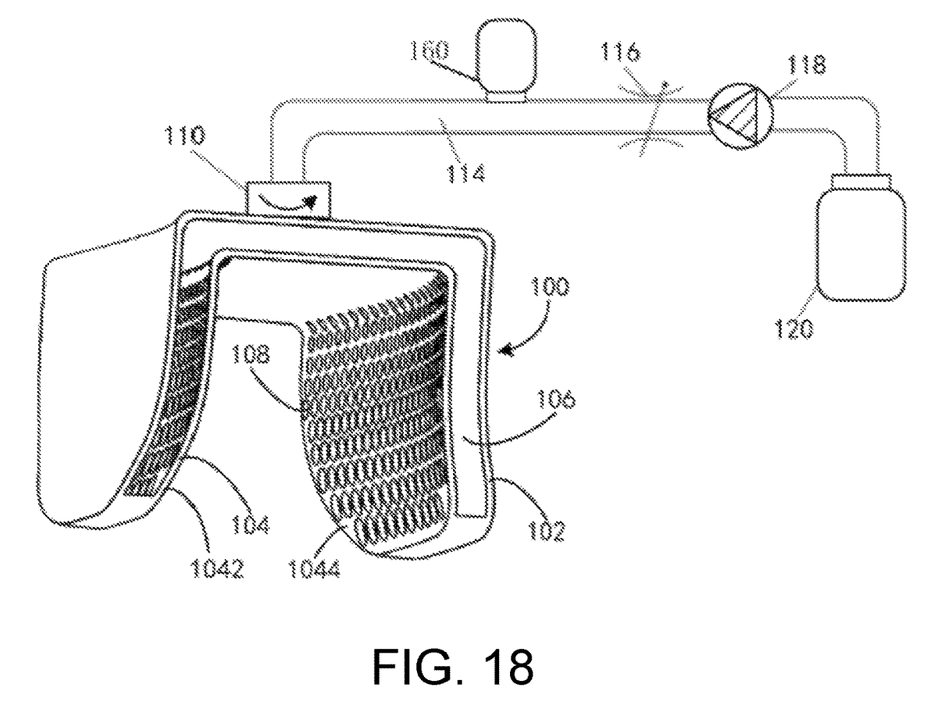
FIG. 18 is a schematic diagram of another smart oral cleaner in an exemplary embodiment of the present disclosure.

As shown in FIG. 18, in an exemplary embodiment of the present disclosure, the smart oral cleaner further includes an abrasive material component. An accommodating cavity 160 of the abrasive material component is configured for placing an abrasive material, and the liquid delivery pipe between the liquid supply component and the tooth-cleaning component 100 is configured to be in communication with the accommodating cavity 160 of the abrasive material component.

In the embodiment, the abrasive material component provides the abrasive material to the tooth-cleaning component 100 and the tooth is rinsed with the cleaning liquid containing the abrasive material through the jet holes 108, which improves the cleaning capacity against plaque on the tooth. The abrasive material includes, but is not limited to, eggshell powder, bone powder, or other molecular particles that can be digested and absorbed by the human body.

Figure 19:
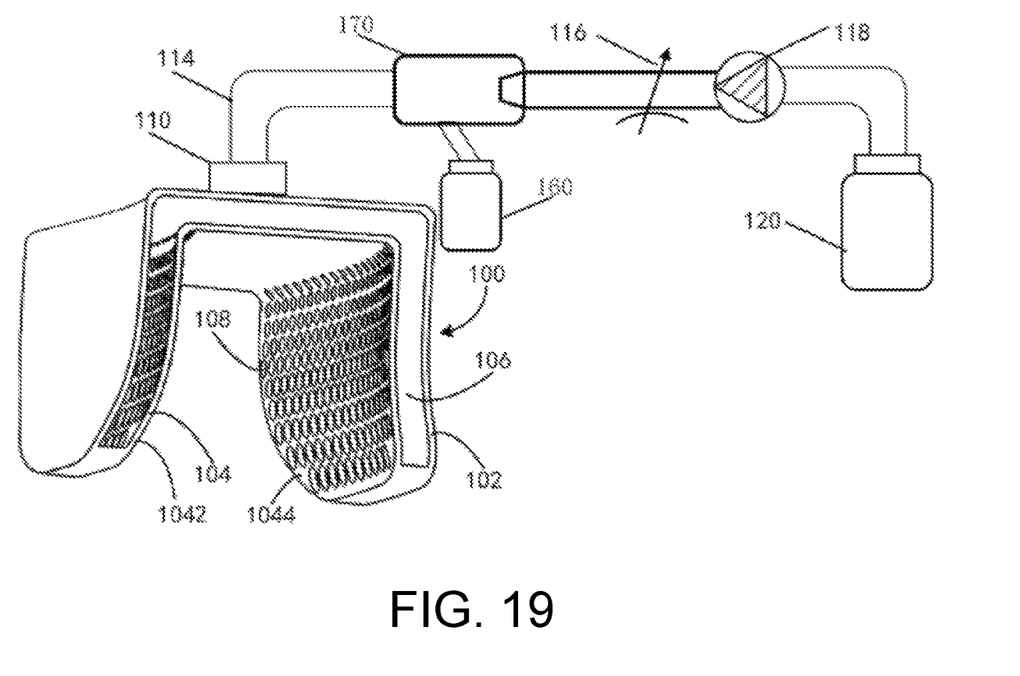
FIG. 19 is a schematic diagram of another smart oral cleaner in an exemplary embodiment of the present disclosure.
Figure 20:
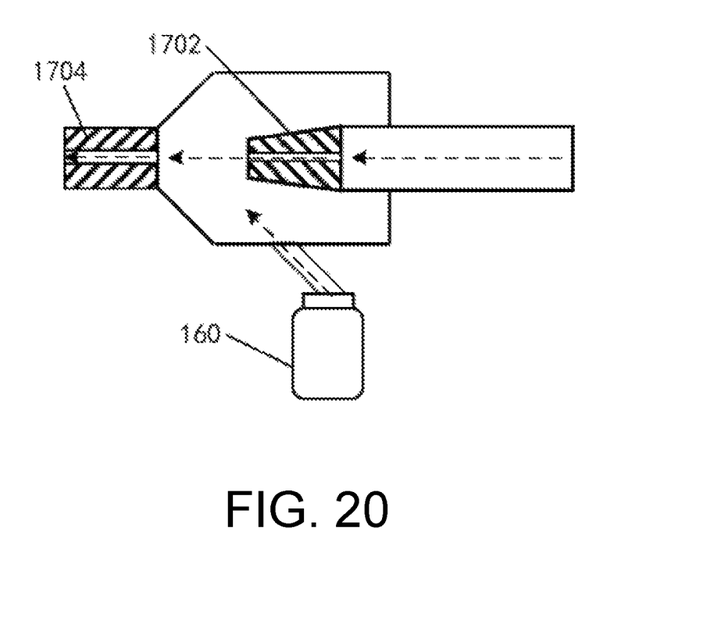
FIG. 20 is a schematic diagram of another smart oral cleaner in an exemplary embodiment of the present disclosure.

As shown in FIG. 19 and FIG. 20, in an exemplary embodiment of the present disclosure, the smart oral cleaner further includes a material-liquid mixing member 170. A first input end of the material-liquid mixing member 170 is connected to a nozzle 1702, a second input end of the material-liquid mixing member 170 is connected to an outlet of the accommodating cavity 160 of the abrasive material component, and an output end 1704 of the material-liquid mixing member is in communication with the hollow structure 106 of the tooth-cleaning component 100 through the liquid delivery pipe.

In the embodiment, the material-liquid mixing member includes the first input end, the second input end, and the output end which are respectively connected to the liquid supply member, the material storage member, and the liquid delivery pipe. Therefore, the abrasive material and the cleaning liquid are mixed in the material-liquid mixing member, the resulting mixture is then delivered to the tooth-cleaning component 100, and the tooth is rinsed with the resulting mixture, which improves the tooth cleaning efficiency and effect.

In an exemplary embodiment of the present disclosure, the smart oral cleaner further includes a pressure regulating valve 116. The pressure regulating valve 116 is disposed in the liquid supply component, and the opening degree of the pressure regulating valve 116 is in positive correlation with the liquid delivery rate in the liquid supply component and/or the opening degree of the pressure regulating valve 116 is in positive correlation with the liquid delivery pressure in the liquid supply component.

In the embodiment, the pressure regulating valve 116 is arranged in the liquid supply component and the liquid delivery rate and the liquid delivery pressure are adjusted through the opening degree of the pressure regulating valve 116, so that the rinsing force against the tooth can be adjusted to meet different rinsing requirements.

In an exemplary embodiment of the present disclosure, the second wall body 104 of the smart oral cleaner can be realized by modifying a general-purpose tray in the following method.

1) A general-purpose tray for the oral cavity is designed and fabricated.
2) The general-purpose tray has a hollow structure defined by an inner layer and an outer layer.
3) The inner layer of the general-purpose tray is provided with arrayed holes of different opening sizes, and the holes are in communication with the hollow structure.
4) The outer layer of the general-purpose tray is provided with a water inlet pipe. The water inlet pipe can rotate 0° to 180° relative to the outer layer of the general-purpose tray and is in communication with the hollow structure.
5) The inner layer and the outer layer of the general-purpose tray can be disassembled and assembled repeatedly, making it easy to clean the inside and outside of the general-purpose tray.
6) The water inlet pipe is connected to an external water supply system through a flexible tube.
7) The water supply system includes a water pump, a pressure regulating valve, and a liquid supply member with the mixed cleaning liquid.
8) The water pump draws the mixed solution to the hollow layer of the general-purpose tray. The mixed solution is forced out, in jets of a certain pressure, from the arrayed holes of different opening sizes in the inner layer of the general-purpose tray onto the surfaces of the tooth, dentition, and gum.
9) The pressure regulating valve regulates and controls the jet pressure and the flow rate of the mixed solution as needed.
10) The general-purpose tray can slide along the dental arch, and the water inlet pipe adaptively rotates relative to the general-purpose tray in sliding.

In practical applications, the general-purpose tray is adaptable to permanent teeth or deciduous teeth and is designed to cover one or more teeth. It can provide cleaning, desensitization, mineralization, and whitening treatment on all the tooth surfaces at the same time and integrates conventional separate devices for tooth brushing, rinsing, desensitization, and whitening, thereby greatly improving the application effect and efficiency.

It should be noted that although several modules or units of an action execution device are mentioned in the above detailed description, this division is not mandatory. Indeed, according to the embodiments of the present disclosure, the characteristics and functions of two or more modules or units described above can be embodied in one module or unit. On the contrary, the characteristics and functions of one module or unit described above can be further embodied by multiple modules or units.

Further, the accompanying drawings are merely schematic illustrations of the processes described in the exemplary embodiments of the present invention, and are not intended to limit the present invention. It is easy to understand that the processes shown in the accompanying drawings do not indicate or limit the time sequence of these processes. In addition, it is also easy to understand that these processes can be, for example, performed synchronously or asynchronously in multiple modules.

Other embodiments of the present disclosure are apparent to persons skilled in the art from consideration of the specification and practice of the invention disclosed herein. This application is intended to cover any variations, uses, or adaptive changes of the present disclosure. These variations, uses, or adaptive changes follow the general principles of the present disclosure and include common knowledges or customary technical means in the technical field that are not disclosed herein. The specification and the embodiments are merely exemplary and the true scope and concept of the present disclosure are defined by the appended claims.

What is claimed is:

1. A smart oral cleaner, comprising:
a tooth-cleaning component, wherein the tooth-cleaning component comprises a first wall body and a second wall body, a hollow structure is formed between the first wall body and the second wall body, the second wall body is recessed towards the first wall body, the second wall body has a first wall surface and a second wall surface arranged opposite to each other, the first wall surface and the second wall surface are provided with jet holes, the second wall body has a shape conforming to a shape of a tooth, and an end surface of the tooth-cleaning component is in a shape of a slope-shaped depression; and retractable tubes, wherein a first limiting protrusion is provided at a first end of each of the retractable tubes, a second limiting protrusion is provided between a second end of each of the retractable tubes and the first end of each of the retractable tubes, the retractable tubes respectively extend through the jet holes in the second wall body, and the first limiting protrusion and the second limiting protrusion are respectively disposed on two sides of the second wall body to limit a moving distance of each of the retractable tubes in the second wall body.

2. The smart oral cleaner according to claim 1, wherein the second wall body further comprises a third wall surface, wherein the third wall surface is connected between the first wall surface and the second wall surface, and the third wall surface has a shape conforming to a shape of an occlusal surface of the tooth.

3. The smart oral cleaner according to claim 2, wherein the third wall surface is provided with the jet holes.

4. The smart oral cleaner according to claim 1, further comprising brush tube cluster structures, wherein the brush tube cluster structures are respectively assembled in the jet holes and the brush tube cluster structures extend from the hollow structure into the slope-shaped depression.

5. The smart oral cleaner according to claim 4, wherein each of the brush tube cluster structures comprises at least one tube, the tube is in communication with the hollow structure, a first end of the tube is assembled to a main body of the each of the brush tube cluster structures, and a second end of the tube extends into the slope-shaped depression.

6. The smart oral cleaner according to claim 1, wherein an opening of a jet hole of the jet holes which is near a bottom of the slope-shaped depression is smaller than an opening of a jet hole of the jet holes which is near an open end of the slope-shaped depression.

7. The smart oral cleaner according to claim 1, wherein an opening of each of the jet holes is in a positive correlation with an accommodation size of the slope-shaped depression; and/or
a distribution density of the jet holes is in a positive correlation with the accommodation size of the slope-shaped depression; and/or
a quantity of the jet holes is in a positive correlation with the accommodation size of the slope-shaped depression.

8. The smart oral cleaner according to claim 1, wherein one of the second wall body and the first wall body is provided with a limiting protrusion, and the other one of the second wall body and the first wall body is provided with a limiting groove, and the limiting protrusion and the limiting groove are configured to be adaptively assembled or disassembled.

9. The smart oral cleaner according to claim 8, further comprising a sealing structure, wherein the sealing structure is provided between the limiting groove and the limiting protrusion and configured for filling a gap between the limiting groove and the limiting protrusion.

10. The smart oral cleaner according to claim 8, further comprising a magnetic attraction component, wherein a first magnetic structure of the magnetic attraction component is disposed on the limiting groove, and a second magnetic structure of the magnetic attraction component is disposed on the limiting protrusion, and the magnetic attraction component is configured to allow the limiting groove to be assembled with the limiting protrusion through a magnetic attraction.

* * * * *